Patented Nov. 24, 1942

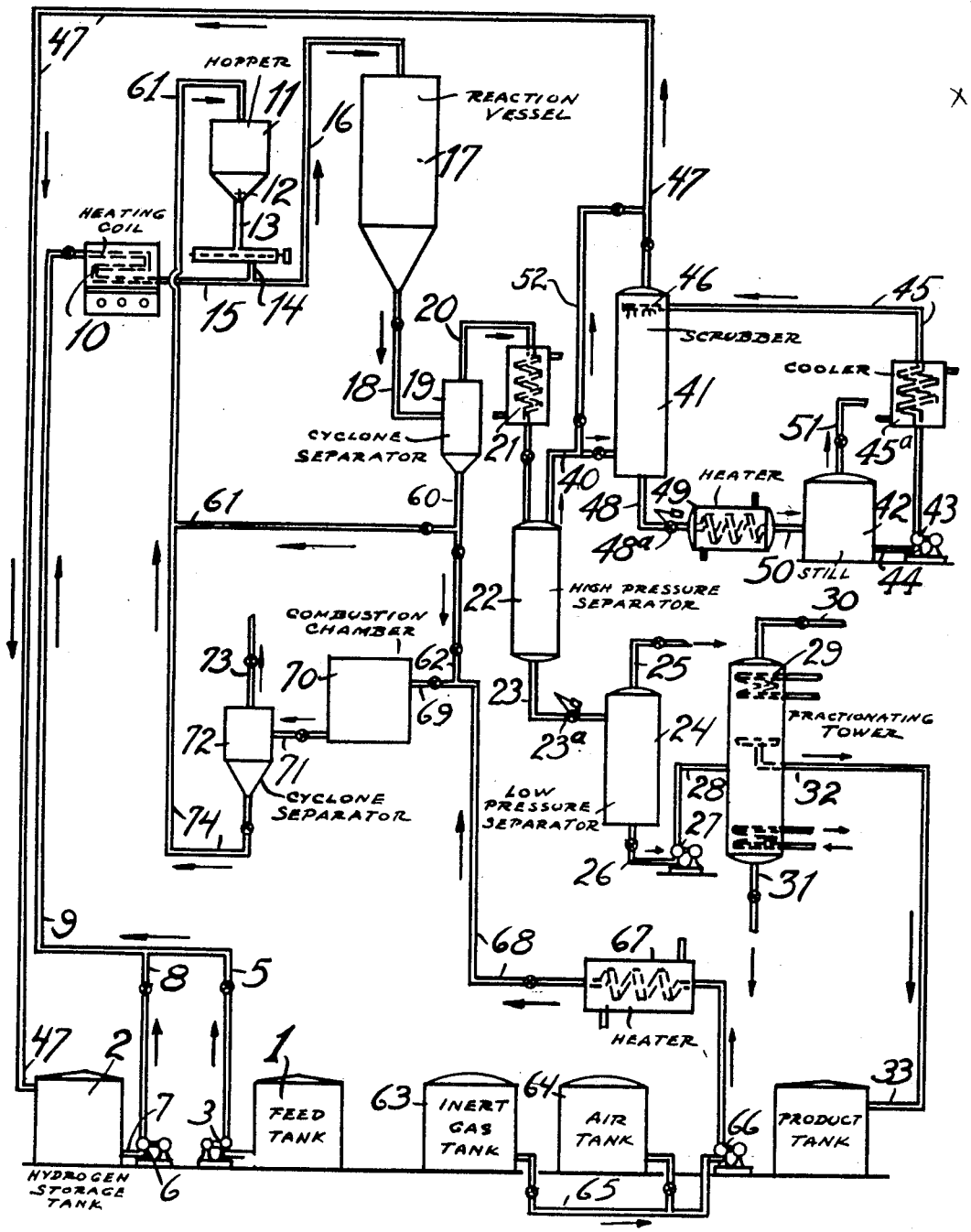

2,303,083

UNITED STATES PATENT OFFICE

2,303,083

CATALYTIC REFORMING OF HYDROCARBON OILS

Paul E. Kuhl, Madison, N. J., assignor, by mesne assignments, to Standard Catalytic Company, a corporation of Delaware Application October 21, 1939, Serial No. 300,511

6 Claims. (Cl. 196—52)

This invention relates to catalytic reforming in the presence of hydrogen and is more particularly concerned with certain improvements in the process when carried out in the presence of finely divided or suspended catalyst.

The term "catalytic reforming" wherever used in the specification and claims shall be understood to mean any process of subjecting materials consisting essentially of hydrocarbons substantially boiling in the gasoline range to heat treatment at a temperature in excess of 500° F. and in the presence of catalysts to produce a dehydrogenated or otherwise chemically reconstructed product, for example of anti-knock characteristics superior to those of the starting material, with or without an accompanying change in molecular weight. By the term "chemically reconstructed" is meant something more than a mere removal of impurities or ordinary finishing treatments. The term catalytic reforming shall be understood to include, but not by way of limitation, reactions such as dehydrogenation, aromatization or cyclization, desulfurization, alkylation and isomerization, all or some of which may occur to a greater or lesser extent during the reaction.

Catalytic reforming, like many catalytic processes for treating hydrocarbon oils, is characterized by the fact that contaminants such as carbonaceous material and coke deposit on the catalyst and gradually reduce its activity. The activity can then be restored by passing hot inert gases containing regulated quantities of oxygen therethrough whereby the coke and carbonaceous material are removed by combustion. It is found that by conducting the catalytic reforming operation in the presence of substantial quantities of added hydrogen or gases rich in free hydrogen the rate at which coke is deposited on the catalyst is substantially retarded and it is therefore possible to operate for appreciably longer periods of time before regeneration is necessary. Catalytic reforming in the presence of hydrogen is further characterized by the fact that it may be carried out under such conditions that there is a substantial net production of free hydrogen in the process, so that after once having started up it is no longer necessary to add hydrogen from an extraneous source because the gases initially added and evolved in the process may be continuously recycled.

Catalytic reforming in the presence of hydrogen may be carried out either with a fixed or stationary catalyst or with a finely divided catalyst suspended in the reacting materials. Suspended catalyst operation has certain definite advantages over fixed catalyst operation. In this type of operation the oil and hydrogen are heated and finely divided catalyst is suspended therein prior to introduction of the reacting materials into the reaction zone. After leaving the reaction zone the products, which are all in gaseous form, are separated from the particles of catalyst in a device such as a cyclone separator. The gaseous products are cooled and the uncondensed products separated from the liquid products. The catalyst is subjected to a regeneration treatment to restore its activity and then the hot regenerated catalyst and the uncondensed gaseous products, which consist chiefly of hydrogen, are recycled through the process together with fresh oil.

I have now found that in suspended catalyst operation in the presence of hydrogen, the catalyst may be passed through the reaction zone a substantial number of times without losing its activity to an appreciable extent, so that it is not necessary to regenerate the entire quantity of catalyst after each passage through the reaction zone. In fact some catalysts are found to be more active in cycles subsequent to the first due to activation which takes place during the first operating period.

It is a principal object of the present invention, therefore, to provide a method of catalytic reforming in the presence of hydrogen using suspended catalyst in which only a portion of the catalyst is subjected to a regeneration treatment after each pass through the reaction zone, and in which the portion of the catalyst so regenerated may be adjusted to maintain a substantially uniform level of catalyst activity at all times. It will be seen that it may be possible to recycle the catalyst for several passes without any regeneration at all, particularly in the early stages of the process when the catalyst is fresh. The method by which this may be done will be fully understood from the following description when read with reference to the accompanying drawing which is a semi-diagrammatic view in sectional elevation of one type of apparatus that may be used and shows the lines of flow.

Referring to the drawing, numeral 1 designates a supply tank for oil to be reformed. This oil may be a hydrocarbon oil derived from any source and having a boiling range generally between 100 and 500° F. Numeral 2 designate a supply tank for hydrogen or a gas rich in free hydrogen. Pump 3 draws oils from tank 1 through line 4 and forces it through line 5. Pump 6 draws hydrogen from tank 2 through line 7 and forces it through line 8. Lines 5 and 8 merge into line 9 and a mixture of oil and hydrogen flows through line 9 and into heating coil 10 wherein it is heated to a temperature between 850 and 1050° F.

Numeral 11 designates a hopper filled with finely divided catalyst, the exact nature of which will be more fully disclosed below. A star feed 12 or some similar device is disposed in the bottom portion of the hopper. The star feeder forces catalyst into a screw conveying means 13 from which finely divided catalyst is forced through line 14 into line 15. The mixture of hot oil and hydrogen leaving coil 10 also flows through line 15 and picks up the catalyst. The oil, in vapor form, together with the hydrogen carries the catalyst along in suspension through line 16 and thence the mixture of oil, catalyst and hydrogen discharges into the upper portion of a reaction vessel 17. When starting up the process, it is desirable to heat the catalyst in the hopper to approximately reaction temperature but after the process has gotten under way this is no longer necessary as will be apparent from that which follows.

The mixture of oil vapors, hydrogen and catalyst is maintained in the reaction zone under pressure between atmospheric and 500 lbs. per square inch, preferably between 50 and 300 lbs. per square inch, and at a temperature between 850 and 1050° F., preferably between 900 and 1000° F. The quantity of gas rich in free hydrogen is preferably between 1000 and 4000 cubic feet per barrel of oil and this gas should contain between 20 and 90 mol percent of hydrogen. The exact quantity of gas used will depend ordinarily upon the concentration of hydrogen therein, so that the larger quantities are used when the concentration of hydrogen is low and vice versa. The quantity of catalyst should be sufficient to provide a catalyst-oil weight ratio of between 1:1 and 100:1, preferably between 2:1 and 50:1. The rate at which the oil is passed through the reaction vessel is between 0.3 and 5.0 volumes of liquid oil per volume of reaction vessel per hour, preferably between 0.3 and 3.0 v/v/hour.

The reaction products are removed from reaction vessel 17 through line 18 and passed while still hot into a cyclone separator 19 or other suitable device for separating the vapors from the solid catalyst. The hot vapors leave the cyclone separator through line 20, pass thence through a cooling means 21 and then discharge into a high pressure separator 22 wherein liquids and gases are separated.

The liquids are removed from high pressure separator 22 through line 23 provided with pressure release valve 23a and then discharge into a low pressure separator 24. Gases are removed from separator 24 through line 25 and removed from the system or passed to a gas absorption plant or otherwise disposed of. Liquids are removed from separator 24 through line 26, pass through a pump 27 wherein pressure may be increased if desired and then flow through line 28 into a stabilizing and fractionating tower 29 wherein the products too volatile and too high boiling are removed. Volatile products are removed through line 30. Heavy ends are removed through line 31, and the desired product is removed from the fractionating tower through line 32 and collected in a storage tank 33.

Returning to the high pressure separator 22 the gases are removed therefrom through line 40. These gases consist principally of hydrogen, methane, ethane and propane. In the event it is desired to remove a portion of the hydrocarbon constituents of these gases in order to increase the hydrogen concentration therein, a portion or all of them may be introduced into the bottom portion of a scrubber 41 wherein they may be scrubbed with a light hydrocarbon oil or other suitable medium for absorbing hydrocarbons. Scrubbing oil such as a hydrocarbon oil of substantially the same boiling range as the feed or product is contained in still 42. Pump 43 draws this oil through line 44 and forces it through line 45 into the top of scrubbing tower 41 where it discharges through a suitable series of openings 46. The downwardly flowing oil scrubs the upwardly rising gases and absorbs a substantial proportion of the hydrocarbon constituents therefrom. The scrubbed gas leaves the scrubber 41 through line 47 and is returned to the hydrogen tank 2 and recycled through the process. The fat scrubber oil leaves the scrubber through line 48 provided with pressure release valve 48a and then flows through a heating means 49 and returns to still 42 through line 50. The combination of pressure reduction and heat strips the scrubber oil of absorbed hydrocarbons which escape from still 42 through line 51. The stripped oil may then be recirculated preferably after passing through a cooling means 45a in line 45. It will be understood that a portion or all of the gases may be by-passed around the scrubber through line 52.

Returning to the cyclone separator 19 the solid catalyst is removed therefrom through a conduit diagrammatically designated as line 60 and then the major proportion or all of it is returned through line 61 to the catalyst hopper 11. The catalyst leaving the cyclone separator 19 is still at approximately reaction temperature and is returned to the hopper at this temperature. For this reason, after once starting up it is not necessary to provide separate means for heating the catalyst.

Each time the catalyst is removed from the reaction vessel only a portion of it is withdrawn and regenerated prior to its return to the system. It is usually only necessary to withdraw and regenerate from 3 to 10% by weight of the catalyst although under certain conditions it may be possible to regenerate as little as 1% or under other conditions it may be necessary to regenerate as much as 20% or more after each passage through the reaction vessel. It will be understood that from time to time it may be possible to recycle the entire quantity of catalyst without regenerating any portion of it if catalyst activity is being maintained.

In order to regenerate the catalyst, the required portion thereof is diverted from line 60 into line 62. Inert gas and air or other oxygen-containing gas are supplied from tanks 63 and 64 respectively. A mixture of inert gas and air is drawn through line 65 by means of pump 66 and then forced through a heating means 67 wherein the gases are heated to a temperature between 600 and 900° F. The heated gas flows through line 68 which meets line 62 carrying catalyst. The hot gas then carries the catalyst in suspension through line 69 into a combustion chamber 70 wherein the coke and carbonaceous deposits are burned off. It will be understood that two or more combustion chambers may be used in series. The combustion products and catalyst pass out of the combustion chamber through line 71 and thence discharge into a cyclone separator 72 or other suitable device for separating gases from solids. The separated gases leave the cyclone separator through line 73 and the separated catalyst leaves through line 74 and is returned to the hopper 11 through line 61.

In the regeneration the quantity of inert gas and air mixture is preferably between 1000 and 3000 volumes per volume of catalyst per hour and the oxygen content of the gas mixture is preferably between 0.3 and 10%. The quantity of oxygen used at the start of regeneration is preferably small to prevent generation of too high a temperature and as the coke is gradually burned off the quantity of oxygen may be increased. During regeneration the maximum temperature should not be allowed to rise above about 1200° F. because higher temperatures appear adversely to affect the structure and activity of the catalyst. The flow of gases is ordinarily continued until there ceases to be a consumption of oxygen therefrom. This indicates that substantially no more combustible matter remains on the catalyst. The length of time it takes to regenerate the catalyst will depend very largely on the quantity of coke which has been deposited thereon during the reaction.

An alternative method of regeneration, not shown, is to pass the catalyst, inert gas and oxygen through a temperature controlled coil and thereafter to separate the catalyst from the gases in a cyclone separator or similar device.

The catalyst used in this process may comprise any one or more of the many materials which promote reforming. The particles of catalyst are preferably of 200 to 400 mesh size or finer. As examples of suitable catalytic materials may be mentioned oxides or sulfides of metals of the IV, V, VI and VIII groups of the periodic system, especially oxides of vanadium, molybdenum, chromium, tungsten, cobalt and nickel. These metal compounds may be used alone, in various mixtures or combinations with each other or in combination with carriers or supports such as aluminum oxide, bauxite, alumina gel, peptized alumina gel, etc. Other suitable catalytic materials are natural clays such as bentonites, montmorillonites, Super-Filtrol, etc. Particularly effective catalysts are mixtures of alumina and chromium oxide, alumina and molybdenum oxide, and alumina and vanadium oxide in which the active metal oxide comprises from 1 to 50% by weight of the mixture.

In the operation of the process, it will be understood that many variations may be made in the different operative steps, such as separation, scrubbing, fractionating and the like, which variations are all within the scope of the present invention.

In starting up the process, a gas rich in free hydrogen may have to be supplied from an extraneous source if such gas is not available from previous operation of the process. However, if no hydrogen is readily available, the necessary hydrogen-containing gas may be generated very readily by operating the process at atmospheric or below atmospheric pressure for a number of hours until sufficient hydrogen-containing gas has been generated and collected. At atmospheric pressure, larger quantities of hydrogen are evolved, but the liquid product produced is not as desirable as that produced at higher pressures. Once a supply of hydrogen-containing gas has been obtained, the process is self-sustaining from the standpoint of hydrogen requirement, because it can be operated to produce a net quantity of hydrogen ranging from 50 to 500 or more cubic feet per barrel of oil. By regulating the scrubbing of the gas according to the quantity of hydrogen being produced, it is possible to maintain the required concentration of hydrogen in the recycle gases indefinitely.

The activity of the catalyst may be maintained at a substantially uniform level by regulating the quantity of catalyst withdrawn and regenerated after each passage through the reaction vessel. For example, if it is observed that the catalyst is losing activity, as may be judged by the increase in aniline point of the product, then a large percentage of the catalyst may be withdrawn and regenerated after each pass. Similarly, if it is observed that the activity of the catalyst is being well maintained, it may not be necessary to regenerate any of it for several passes.

This process can be applied to hydrocarbon oils derived from any source. For example, virgin naphthas, paraffinic naphthas, naphthenic naphthas, cracked naphthas, fractions boiling between 100 and 500° F. obtained from the products of destructive distillation, cracking, destructive hydrogenation, carbonization or hydrogenation of coals, tars, mineral oils, shales, peats, lignites, bitumens and other carbonaceous materials, or hydrocarbon oils obtained by solvent extraction, polymerization or by synthetic processes such as the Fischer synthesis may all be subjected to treatment by this process with satisfactory results.

This invention is not limited by any theories of the mechanism of the reactions nor by any details which have been given merely for purposes of illustration but is limited only in and by the following claims in which it is intended to claim all novelty inherent in the invention.

I claim:

1. In a process of catalytic reforming of hydrocarbon oil in the presence of hydrogen in which the catalyst is suspended in finely divided form in the vaporized reacting materials, is separated from the reaction products after each passage through the reaction zone and is then regenerated and recycled thereto, the improved method of operation which comprises recycling the catalyst to the reaction zone after each passage therethrough without regenerating any portion thereof until the activity of the catalyst has reached a maximum and thereafter regenerating only such percentage of the catalyst after each passage through the reaction zone as is necessary to maintain the activity of the entire quantity of the catalyst at a substantially constant level.

2. Process according to claim 1 in which the quantity of catalyst subjected to regeneration after each passage through the reaction zone and prior to recycling thereto is between 3 and 10% by weight.

3. Process according to claim 1 in which the ratio of catalyst to oil in the reaction zone is above 2:1.

4. Process according to claim 1 in which the ratio of catalyst to oil in the reaction zone is between 2:1 and 50:1.

5. Process according to claim 1 in which the quantity of catalyst subjected to regeneration after each passage through the reaction zone and prior to recycling thereto is between 1 and 20% by weight.

6. Process according to claim 1 in which the reaction zone is maintained at a temperature between 900 and 1000° F. and under a pressure between 50 and 300 pounds per square inch.

PAUL E. KUHL.